United States Patent [19]

Hayashida

[11] 3,942,326

[45] Mar. 9, 1976

[54] HYDRAULIC BRAKE FORCE-MULTIPLYING DEVICE

[75] Inventor: Yoshihiro Hayashida, Chigasaki, Japan

[73] Assignee: Tokico Ltd., Japan

[22] Filed: July 15, 1974

[21] Appl. No.: 488,843

[30] Foreign Application Priority Data
Mar. 18, 1974 Japan.............................. 49-30834

[52] U.S. Cl. ...................... 60/563; 60/566; 60/592; 91/391 R
[51] Int. Cl.² .......................................... B60T 13/58
[58] Field of Search ............. 60/547, 550, 552, 558, 60/560–567, 551, 563–567, 591–593; 91/434, 391 R

[56] References Cited
UNITED STATES PATENTS

| | | | |
|---|---|---|---|
| 3,173,339 | 3/1965 | Larsen ............................... | 91/391 R |
| 3,208,212 | 9/1965 | Schultz ............................. | 60/566 X |
| 3,253,409 | 5/1966 | Kellogg et al. ..................... | 60/547 X |
| 3,327,479 | 6/1967 | Harness et al. ...................... | 60/550 |
| 3,410,090 | 11/1968 | Thirion .............................. | 60/591 X |
| 3,473,849 | 10/1969 | Smith et al. ........................ | 60/591 X |
| 3,875,748 | 4/1975 | DeHoff ............................... | 60/592 |

FOREIGN PATENTS OR APPLICATIONS

| | | | |
|---|---|---|---|
| 463,525 | 4/1937 | United Kingdom................... | 91/434 |
| 862,465 | 3/1961 | United Kingdom................... | 60/547 |

Primary Examiner—Martin P. Schwadron
Assistant Examiner—H. Burks, Jr.
Attorney, Agent, or Firm—Wenderoth, Lind & Ponack

[57] ABSTRACT

A hydraulic brake force-multiplying device includes a body, an output member fitted slidably in the body, a working chamber defined between the output member and the body, a pressure chamber defined in the body and receiving pressure fluid introduced from a source of pressure fluid, a valve seat member positioned in the pressure chamber and urged against the body under fluid pressure of the pressure chamber, a rod member provided integrally with the valve seat member and extending to the interior of the working chamber, a guide bore extending through the rod member axially, a valve stem having a valve portion adapted to cooperate with a valve seat of the valve seat member, thereby forming a valve mechanism in combination with the valve seat, and being sealingly and slidably fitted in the guide bore, an input shaft provided in the body adjacent to one end of the valve stem remote from the working chamber, an intermediate chamber defined between the input shaft and the valve stem and adapted to be communicated by way of the valve mechanism with the pressure chamber, a passage provided in the valve stem and communicating the intermediate chamber with the working chamber by way of the guide bore, and a passage provided in the input shaft for providing communication between the intermediate chamber and a drain tank, the communication therebetween being blocked when the input shaft is actuated so as to engage with the valve stem.

3 Claims, 1 Drawing Figure

U.S. Patent   March 9, 1976   3,942,326
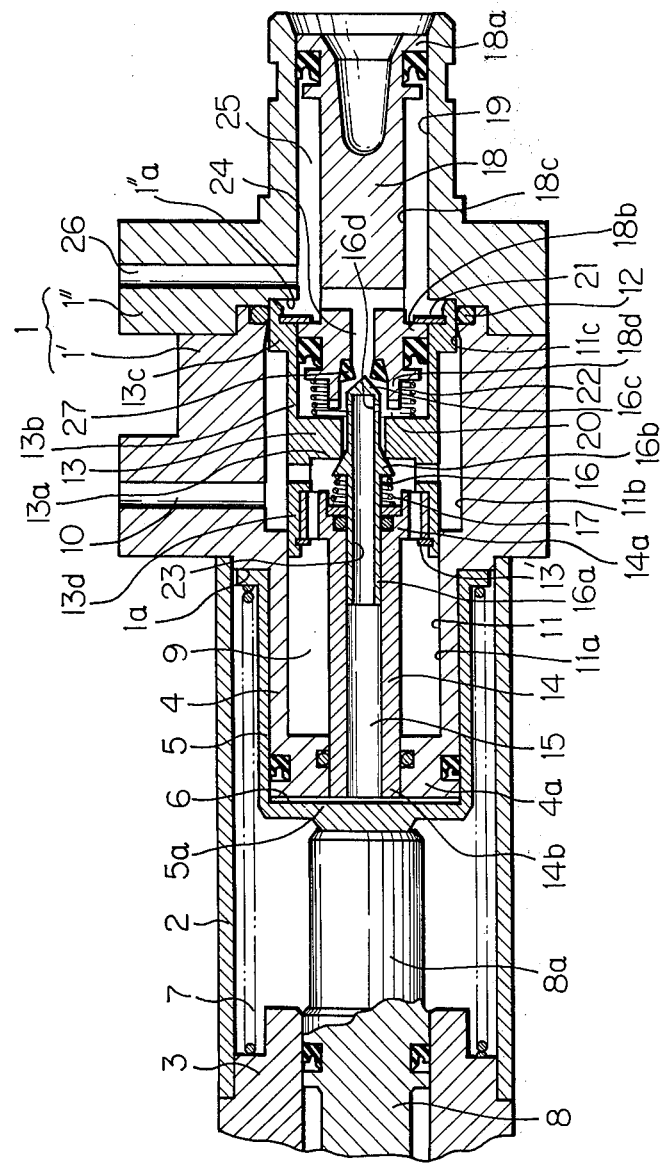

HYDRAULIC BRAKE FORCE-MULTIPLYING DEVICE

BACKGROUND OF THE INVENTION

This invention relates to a hydraulic brake force multiplying device of the type which is connected directly to a master cylinder in a brake system of an automobile or the like, and wherein when fluid pressure from a source of pressure fluid (a power pump, etc.) is in normal condition, the device is adapted to operate as a so-called non-stroke type device (stroke of an input shaft is determined merely so as to open or close a valve mechanism involved in the device, irrespective of the stroke of the master cylinder), and wherein when pressure source fails the device is adapted to directly actuate the master cylinder.

SUMMARY OF THE INVENTION

It is a principal object of the present invention to provide a hydraulic brake force-multiplying device, wherein a valve stem for providing the valve mechanism is reduced in size, thereby improving the sealing performance of the valve mechanism and giving an improved manipulating feeling to a driver.

BRIEF DESCRIPTION OF THE DRAWING

Description will be given of a preferred embodiment of the present invention with reference to the accompanying drawing.

The accompanying drawing shows a cross-sectional view of a preferred embodiment of a fluid brake force-multiplying device according to the present invention.

DETAILED DESCRIPTION OF THE INVENTION

The body 1 of the device is composed of members 1' and 1", which are secured together and are connected by a cylindrical spacer 2 to a master cylinder 3. The body 1 has a projecting portion 4 extending from the member 1' toward the master cylinder 3.

Shown at 5 is a cup-shaped output member, which receives therein the outer periphery of the aforesaid projecting portion 4 slidably and sealingly, in such a manner that a working chamber 6 is defined by the bottom wall of the output member 5 and the end wall of the projecting portion 4. The output member 5 is urged in the direction of a stopper portion 1a of the body 1 under the action of a spring 7. The output member 5 has a closed end 5a and is associated with a projecting portion 8a extending from a piston 8 of the aforesaid master cylinder 3.

Designated 9 is a pressure chamber, to which pressure fluid is introduced by way of a fluid introducing passage 10 from a source of pressure fluid such as a hydraulic pump or an accumulator, the pressure chamber 9 being defined within a hollow portion 11 provided in the member 1'. The hollow portion 11 has a diametrically smallest portion 11a, a diametrically enlarged portiion 11b and a diametrically reduced portion 11c which is contiguous to the end of the member 1" and has a diameter slightly smaller than the diametrically enlarged portion 11b. Provided between the diametrically reduced portion 11c and the end wall 1"a of the member 1" is an O-ring 12 for providing sealing therebetween.

Denoted at 13 is a valve seat member positioned in the pressure chamber 9. The valve seat member 13 has a valve seat 13a, a cylindrical portion 13b extending rightwards therefrom as viewed in the drawing and a diametrically enlarged portion 13c provided in the right-hand portion and fitted in the aforesaid diametrically reduced portion 11c of the hollow portion 11, thereby providing sealing in combination with the O-ring 12. A space is left between the outer periphery of the diametrically enlarged portion 13c and the inner periphery of the diametrically enlarged portion 11b of the hollow portion 11. The valve seat member 13 is provided with a projecting portion 13d extending from the valve seat 13a leftwards as viewed in the drawing, which projecting portion 13d is carried on the wall of diametrically smallest portion 11a of the aforesaid hollow portion 11. The valve seat member 13 is normally urged rightwards as viewed in the drawing under the fluid pressure from the pressure chamber 9, whereby the end wall of diametrically enlarged portion 13c bears against the end wall 1"a of the member 1" to be retained therein.

Shown at 14 is a rod member, whose one end 14a is diametrically enlarged and fitted in a recess of projecting portion 13d of valve seat member 13 in a manner to bear against the shoulder of projecting portion 13d and to be securely coupled to the valve seat member 13 by means of a retaining ring 13'. The other end 14b of rod member 14 sealingly and slidably extends through the bottom wall 4a of the projecting portion 4 to extend into the working chamber 6. The rod member 14 is provided with a guide bore 15 extending in the axial direction thereof.

Shown at 16 is a valve stem, whose one end portion 16a is sealingly and slidably fitted in the guide bore 15 of the rod member 14, and which has a valve portion 16b in the right-hand portion, the valve portion 16b being adapted to contact or detach from the valve seat 13a of the valve seat member 13, thereby providing a valve mechanism. The valve stem 16 is urged under the action of a spring 17 in the direction of urging the valve portion 16b against the valve seat 13a of valve seat member 13.

Shown at 18 is an input shaft, which has land portions 18a, 18b and a diametrically reduced portion 18c, the land portion 18a being sealingly and slidably fitted in a bore 19 provided in the member 1" and the land portion 18b being sealingly and slidably fitted in a hollow portion of the valve seat member 13. The land portion 18b defines an intermediate chamber 20 with the valve stem 16 in the interior of the hollow portion of the valve seat member 13. The intermediate chamber 20 is brought into communication with the pressure chamber 9 when the valve portion 16b of valve stem 16 is detached from the valve seat 13a but the communication therebetween is normally blocked by the valve mechanism 16b, 13a. The input shaft 18 is provided with a projecting portion 18d extending from the land portion 18b toward the interior of intermediate chamber 20, with the end thereof positioned in the vicinity of the valve seat 13a of the valve seat member 13. The end face of the land portion 18b of the input shaft 18 bears against a stopper 21 provided on the diametrically enlarged portion 13c of the valve seat member 13, thereby controlling the rightward motion of the input shaft. Shown at 22 is a spring for biassing the input shaft 18 to its home position shown in the drawing.

A passage 23 and at least one radial passage 16d, for communicating the working chamber 6 with the intermediate chamber 20 by way of the guide bore 15, are provided in the valve stem 16. Shown at 24 is a passage for communicating the intermediate chamber 20 provided in the input shaft 18 with a drain tank or a reservoir (not shown), the passage 24 being connected by way of an annular space 25 to a fluid discharging passage 26. The annular space 25 is adapted to be communicated with the pressure chamber 9, but when in the source of fluid pressure is in the normal condition, the annular hollow portion 25 is blocked from the pressure chamber 9 by means of the diametrically enlarged portion 13c of the valve seat member 13 and the O-ring 12 which serve as a sealing member.

A valve 16c is provided in the end portion of valve stem 16 positioned within the intermediate chamber 20, and a valve seat 27 is provided in the projecting portion 18d of the input shaft 18. The valve 16c and the valve seat 27 are brought into contact with or detached from each other, thereby providing a valve mechanism, which opens or closes the passage 24 for communicating the intermediate chamber 20 and the drain tank with each other or cutting off communication therebetween.

The hydraulic brake force multiplying device having the construction as described operates as follows.

If a manipulating force is applied to a brake pedal by a driver so as to bring into operation the hydraulic brake force multiplying device which has been maintained in the inoperative position shown in the drawing, the input shaft 18 is shifted leftwards. The leftward movement of the input shaft 18 causes the valve seat 27 to engage with the valve 16c of the valve stem 16, to thereby interrupt the communication of the fluid discharge passage 26 with the intermediate chamber 20 and the working chamber 6. The further leftward movement of the input shaft 18 moves the valve stem 16 in the same direction, whereby the valve portion 16b is detached from the valve seat 13a of the valve seat member 13, thereby communicating the pressure chamber 9 and the intermediate chamber 20 with each other. Consequently, pressure fluid is introduced through the passages 16d, the passage 23 and the guide bore 15, into the working chamber 6, so that the output member 5 will be moved leftwards, thereby actuating the piston 8 in the master cylinder 3 in the same direction, whereby the braking action is conducted.

Since the input shaft 18 receives at its inner end, i.e. the left end in the drawing, pressure which has been introduced in the working chamber 6 during the above movement, a driver experiences reacting force or an operating feeling, by way of the input shaft 18.

If, during the above movement, reacting force due to fluid pressure acting on the input shaft 18 becomes slightly larger than the manipulating force which is being applied to the input shaft 18 by a driver, the input shaft 18 is slightly moved backwards (rightwards), as a result of which the valve stem 16 is also moved backwards under the actions of the fluid pressure and the spring 17, so that the valve portion 16b will come to a position just contacting the valve seat 13a, thereby cutting off communication between the pressure chamber 9 and the intermediate chamber 20. Such action is effected within the scope of resilient deformation of the valve seat 27, and hence such action is effected with the valve seat 27 and the valve 16c of valve stem 16 maintained in contact.

When the input force applied to the brake pedal is relieved, the input shaft 18 is moved backwards (rightwards as viewed in the drawing) under the actions of the fluid pressure and the return spring 22 until the land portion 18b comes into contact with the stopper 21. Consequently, the valve seat 27 of the input shaft 18 detaches from the valve 16c of the valve stem 16, thereby communicating the intermediate chamber 20 with the fluiid discharge passage 26. Thus, the output member 5 is shifted backwards, causing fluid pressure within the working chamber 6 to discharge to the discharge passage 26, until the member 5 comes to bear against the stopper 1a under the actions of the spring 7 and a return spring (not shown) for the piston 8 in the master cylinder 3.

In case the manipulating force is abruptly applied to the brake pedal, the valve portion 16b would normally be detached from the valve seat 13a to be spaced apart therefrom to a considerable extent for a short period of time, so that a large quantity of pressure fluid within the pressure chamber 9 would be streamed into the intermediate chamber 20 to act as an impact on the input shaft 18 and output member 5. This would be responsible for an unstable motion of the input shaft and the output member. The problem, however, is avoided in the present invention by the provisions of the projecting portion 18d in the input shaft 18 and the valve seat member 13.

That is, even if a driver abruptly applies manipulating force to the brake pedal, the valve seat member 13 remains in the position shown in the drawing, as long as the pressure source is in the normal condition. Accordingly, once the projecting portion 18d of input shaft 18 bears against the valve seat 13, the input shaft 18 will no longer be moved in the same direction. Thus, there is no risk that the valve portion 16b is spaced apart from the valve seat 13a to a greater extent. In this case, the opening of the valve is substantially equal to or slightly larger than that in the case where the manipulating force is gradually applied to the brake pedal.

When the function of the pressure source is lost, the above-described operation due to fluid pressure does not take place, but the manipulating force applied to the brake pedal will be transmitted directly to the master cylinder.

When the function of the pressure source is lost, the pressure within the pressure chamber 9 will be lowered, so that the valve seat member 13 will be allowed to move in the same direction as the motion of the valve stem 16 in the direction of opening the valve. Thus, if the brake pedal is actuated, the input shaft 18 is moved leftwards, and then the projecting portion 18d of input shaft 18 comes to contact against the valve seat member 13. Subsequently, the left end 14b of the rod member 14 which moves integrally with the valve seat member 13 comes to contact against the closed end 5a of the output member 5, thereby actuating the output member 5.

In this case, when the valve seat member 13 is moved leftwards, the diametrically enlarged portion 13c thereof becomes detached from the O-ring 12, thereby communicating the pressure chamber 9 with the drain tank by way of the annular space 25, whereby the working chamber 6 and the intermediate chamber 20 are brought into communication with the drain tank by way of the pressure chamber 9. Fluid within those chambers 6, 9 and 20 has no effect on the movement of the valve seat member 13.

If the input which has been applied to the brake pedal is relieved, the output member 5 is moved rightwards to its home position under the actions of the spring 7 and the return spring for the piston 8 in the master cylinder 3, whereby the rod member 14, the valve seat member 13 and the input shaft 18 are all returned to their home positions.

As is apparent from the foregoing, when the function of the pressure source is lost, the device of the present invention makes it possible to directly actuate the master cylinder 3. Since the valve stem 16 does not participate in such actuation of the output member 5, the valve stem 16 may be reduced in size, with the result of providing an improved sealing performance between the valve stem and the valve seat 13a as well as permitting the use of a weak spring 17. This contributes to extending service life of the valve seat 27, because of the force to be exerted thereon being reduced.

The hydraulic brake force multiplying device having the construction and functions as described provides the below-mentioned advantages.

a. The valve stem 16 is reduced in size, thereby providing an improved sealing performance between the valve stem and the valve seat 13a, as well as permitting use of a weak spring, with the result of extension in service life of the valve seat 27.

b. Since the stroke of the input shaft 18 is limited by the valve seat member 13, irrespective of whether the manipulating force is applied gradually or abruptly to the brake pedal, an excellent operating feeling is given to a driver. This contributes to enhancing safety, particularly in case the device of the present invention is applied as a brake device to an automobile or the like.

c. The device is so adapted as to operate as a so-called stroke type device when the pressure source is in the normal condition, and to directly actuate the master cylinder when the function of the pressure source is lost, with the result that a driver is relieved from fatigue, with resultant improved safety.

d. When there is a failure of the pressure source, fluid within the pressure chamber 9, the working chamber 6 and the intermediate chamber 20 has no effect on the movement of the valve seat member 13, so that the manipulation of the brake pedal is easy and smooth.

What is claimed is:

1. A braking force multiplying device for use in a hydraulic braking system of the type including a master cylinder, a source of hydraulic fluid, and a fluid drain, said device comprising:
    a body coupled to said master cylinder, said body having a projecting portion extending toward said master cylinder;
    a cup-shaped power piston having a first open end and a second closed end, said projecting portion having an outer periphery sealingly and slidably received through said open end of said power piston, said closed end of said power piston cooperating with a piston of said master cylinder;
    a working chamber defined between said power piston and said projecting portion;
    a bore extending through said body coaxially with respect to said power piston;
    a valve seat member slidably fitted in said bore, a first end of said valve seat member extending into said working chamber and sealingly extending through a first diameter portion of said bore, a second end of said valve seat member being in a second diameter portion of said bore, said second diameter portion having a greater diameter than said first diameter portion, said valve seat member and said body defining therebetween a pressure chamber, said pressure chamber being permanently connected to said source of hydraulic fluid;
    said valve seat member having a guide bore extending therethrough;
    a valve stem member being slidably and sealingly fitted in said guide bore;
    a first normally closed valve means formed by a valve body on said valve stem member and a seat on said valve seat member;
    an input shaft slidably and sealingly fitted in said body, said input shaft being normally spaced from said valve seat member;
    an intermediate chamber defined between a first inner end of said input shaft and said valve seat member;
    first passage means in said valve stem member for permanently communicating said intermediate chamber with said working chamber;
    second passage means in said input shaft for providing communication between said intermediate chamber and said fluid drain;
    a second valve means formed between said input shaft and said valve stem member, when said input shaft is moved inwardly of said body, for blocking communication between said intermediate chamber and said fluid drain; and
    said input shaft comprising means, when said input shaft is moved inwardly of said body, for opening said first valve means and for communicating said intermediate chamber with said pressure chamber.

2. A device as claimed in claim 1, wherein said second end of said valve seat member comprises an increased diameter portion, and said second diameter portion of said bore has a tapering reduced diameter section, said increased diameter portion of said second end of said valve seat member being urged to engagement with said tapering reduced diameter section by the pressure in said pressure chamber.

3. A device as claimed in claim 1, wherein said first end of said valve seat member comprises a reduced diameter section.

* * * * *